US008886723B1

(12) United States Patent
Gargi et al.

(10) Patent No.: US 8,886,723 B1
(45) Date of Patent: Nov. 11, 2014

(54) ASSESSING SHARING OF ITEMS WITHIN A SOCIAL NETWORK

(75) Inventors: Ullas Gargi, Sunnyvale, CA (US);
Sanketh Shetty, Sunnyvale, CA (US);
Tomáš Ižo, San Francisco, CA (US);
Charles Duhadway, Sunnyvale, CA (US); Kevin Snow McCurley, San Jose, CA (US); Nisarg Dilipkumar Kothari, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/529,868

(22) Filed: Jun. 21, 2012

Related U.S. Application Data

(60) Provisional application No. 61/570,766, filed on Dec. 14, 2011.

(51) Int. Cl.
*G06F 15/16* (2006.01)
*G06F 15/173* (2006.01)

(52) U.S. Cl.
USPC .......................................... 709/204; 709/224

(58) Field of Classification Search
CPC ... G06Q 30/02; G06Q 50/01; G06Q 30/0245; G06Q 30/0269; H04L 67/22; H04L 67/306; G06F 17/3053; G06F 3/0481; H04M 2201/38; H04M 2201/42; H04M 7/0027; H04W 4/206

USPC ........................................... 709/204, 215, 224
See application file for complete search history.

(56) References Cited

U.S. PATENT DOCUMENTS

| 7,870,020 | B2 | 1/2011 | Bengtsson et al. | |
|---|---|---|---|---|
| 8,655,938 | B1* | 2/2014 | Smith et al. | 709/200 |
| 2007/0192349 | A1 | 8/2007 | Farr et al. | |
| 2008/0195546 | A1 | 8/2008 | Lilley | |
| 2010/0228614 | A1 | 9/2010 | Zhang et al. | |
| 2011/0282943 | A1* | 11/2011 | Anderson et al. | 709/204 |
| 2013/0211883 | A1* | 8/2013 | Vesely et al. | 705/7.39 |

* cited by examiner

*Primary Examiner* — Ebrahim Golabbakhsh
(74) *Attorney, Agent, or Firm* — Lowenstein Sandler LLP

(57) ABSTRACT

A method for assessing sharing of items within a social network is provided. The method includes identifying a first sharing of a social item by a first user of a social network, determining one or more second sharings of the social item by one or more second users, the one or more second sharings being based on the first sharing. The method also includes determining a sharing score associated with the first user based on a number of the one or more second sharings, and updating a data structure based on the determined sharing score associated with the first user. The data structure stores respective sharing scores associated with the plurality of users of the social network. Systems and machine-readable media are also provided.

19 Claims, 5 Drawing Sheets

ASSESSING SHARING OF ITEMS WITHIN A SOCIAL NETWORK

CROSS-REFERENCE TO RELATED APPLICATION

This application claims the benefit of U.S. Provisional Patent Application No. 61/570,766, filed Dec. 14, 2011, which is incorporated herein by reference in its entirety.

BACKGROUND

Social networking sites have allowed people to communicate with one another. Through social networking sites, users may share social items such as music, videos, articles, website links and other items that may be of interest with other users.

SUMMARY

The present disclosure generally relates to social networking, and more particularly to a computer-implemented method for assessing sharing of items within a social network. The method includes identifying a first sharing of a social item by a first user of a social network, and determining one or more second sharings of the social item by one or more second users, the one or more second sharings being based on the first sharing. The method also includes determining a sharing score associated with the first user based on a number of the one or more second sharings, and updating a data structure based on the determined sharing score associated with the first user. The data structure stores respective sharing scores associated with the plurality of users of the social network.

These and other aspects can include one or more of the following features. The identifying the first sharing of the social item may include identifying that the social item is made accessible to one or more users of the social network other than the first user. The determining the one or more second sharings of the social item may include determining that the social item is made accessible to one or more users within the social network or outside the social network. The determining the sharing score may include determining the sharing score based on the first sharing.

Additionally, the method may include determining an influence score associated with the first user based on a number of views of the social item by the plurality of users.

The method may further include identifying a prior sharing of a prior social item by the first user, wherein the determining the influence score further comprises determining the influence score based on a number of views of the prior social item by the plurality of users.

The method may further include determining one or more third sharings of the social item by one or more third users of the plurality of users based on a second sharing of the one or more second sharings, wherein the determining the sharing score further comprises determining the sharing score based on a number of the one or more third sharings.

The determining the sharing score may include assigning different weights to the number of the one or more second sharings and the number of one or more third sharings. The determining the sharing score may include determining the sharing score during a predetermined period of time.

The method may further include generating a high score user interface comprising sharing scores associated with the plurality of users, including the first user, that exceed a predetermined value.

The method may further include notifying the first user of at least one of the sharing score associated with the first user or a number of views of the social item.

The method may further include assigning a monetary value to the sharing score.

The method may further include normalizing a plurality of sharing scores associated with the first user over a number of first sharings of social items by the first user.

The disclosed subject matter further relates to a system for assessing sharing of items within a social network. The system includes a memory and a processor. The memory stores a data structure storing respective sharing scores associated with a plurality of users of a social network. The memory also stores executable instructions. The processor is coupled to the memory and is configured to execute the stored executable instructions to identify a first sharing of a social item by a first user of a plurality of users within a social network, and determine a second sharing of the social item by a second user of the plurality of users, the second sharing being based on the first sharing. The processor is also configured to determine one or more third sharings of the social item by one or more third users of the plurality of users, the one or more third sharings being based on the second sharing, and determine a first sharing score associated with the first user based on a number of second sharings and the one or more third sharings. The processor is further configured to determine a second sharing score associated with the second user based on a number of the one or more third sharings, and update the data structure based on the determined first sharing score associated with the first user and the determined second sharing score associated with the second user.

These and other aspects can include one or more of the following features. The determining the first sharing score may include determining the first sharing score based on the first sharing.

The processor may be additionally configured to determine an influence score associated with the first user based on a number of views of the social item by the plurality of users.

The processor may be further configured to identify a prior sharing of a prior social item by the first user, wherein the determining the influence score further comprises determining the influence score based on a number of views of the prior social item by the plurality of users.

The determining the first sharing score may include determining the first sharing score during a predetermined period of time, wherein the determining the second sharing score comprises determining the second sharing score during the predetermined period of time.

The processor may be further configured to generate a high score user interface comprising sharing scores associated with the plurality of users, including the first user, that exceed a predetermined value.

The disclosed subject matter also relates to a machine-readable storage medium including machine-readable instructions for causing a processor to execute a method for assessing sharing of items within a social network. The method includes identifying a plurality of primary sharings, including a first primary sharing, of social items by a primary user of a plurality of users within a social network. Each primary sharing shares a different social item on the social network, and the first primary sharing shares a first social item. The method also includes determining a plurality of secondary sharings by users other than the primary user of the plurality of users, each of the plurality of secondary sharings being based on the first primary sharing, and determining a sharing score associated with the primary user based on a number of the plurality of secondary sharings. The method further includes determining an influence score associated with the primary user based on a number of views of the first social item by the plurality of users, and updating a data structure based on the determined sharing score associated with the primary user and the determined influence score associated with the primary user. The data structure stores respective sharing scores and influence scores associated with the plurality of users of the social network. The method yet further includes notifying the primary user of at least one of the sharing score or the influence score.

These and other aspects may provide one or more of the following advantages. A social networking site may efficiently encourage users to share high quality social items more, and early on. Also, having more items shared earlier than other competing sites may further attract potential users.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For the purpose of explanation, several embodiments of the subject technology are set forth in the following figures.

DETAILED DESCRIPTION

Figure 1:
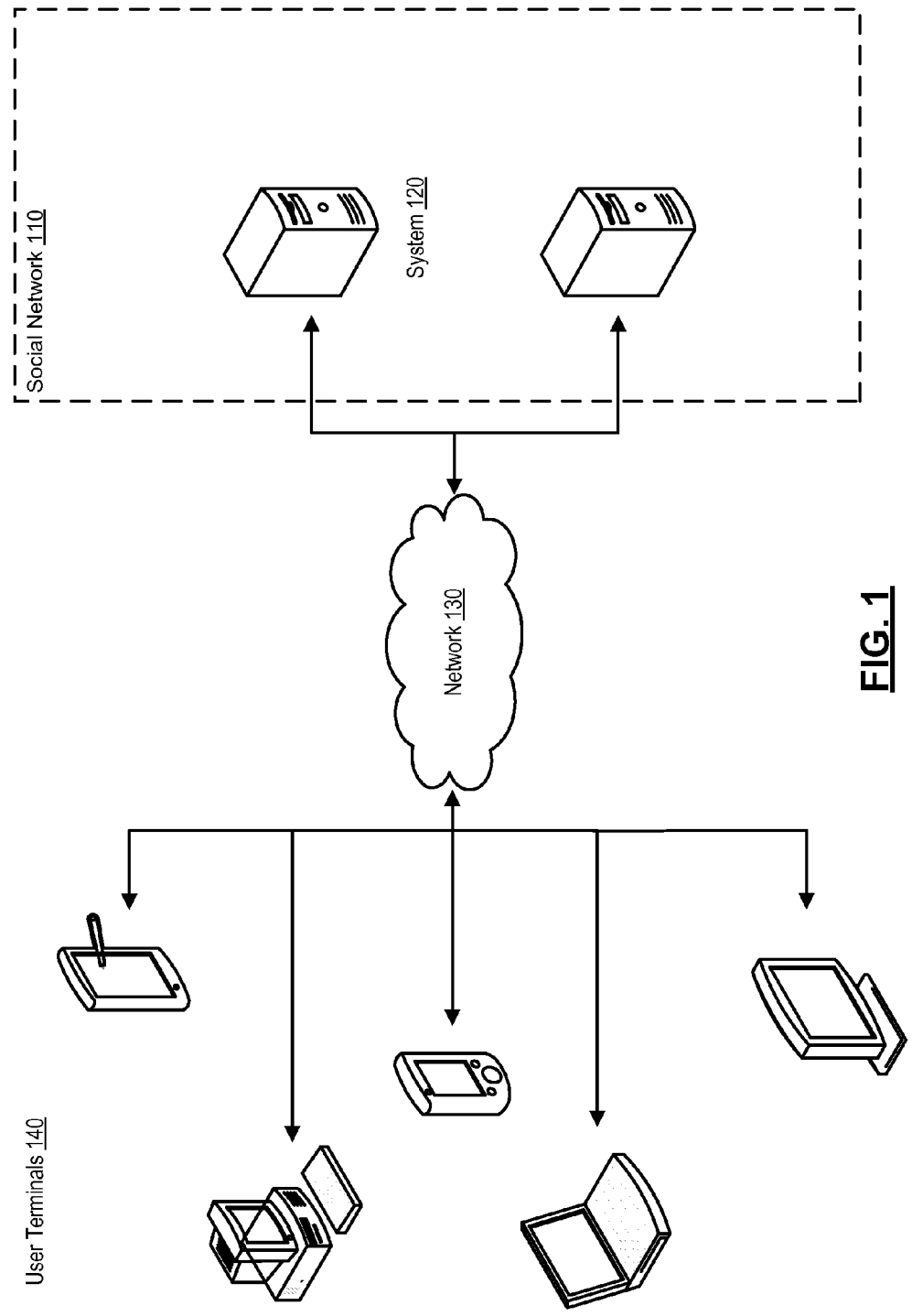
FIG. 1 illustrates example architecture including a system for assessing sharing of items within a social network.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As more users share high quality items, the social network typically attracts more users. However, it may be a challenge for the social networking site to encourage users to share high quality social items, and to encourage users to share such items early on. Such social items may be, for example, web site links, videos clips, articles or other items that the users of the social network may find interesting. Also, having more items shared earlier than other competing sites may further attract potential users. However, while some enthusiastic users, or "power users," may actively share quality items as soon as such items are available, the majority of the users are casual sharers, and often times their shared items are re-shares of what other power users have already shared.

According to the various aspects of the subject technology, a system and method for assessing sharing of items within a social network is provided. The system encourages users of a social network to share high quality social items by allowing the users to play a game where the users are assigned points or a score based on how early the users identify and share items that go on to become popular or memetic. For example, user A may share a video clip on a social network. Then, other users of the social network may re-share user A's video clip. As more users re-share user A's video clip, user A may receive more points. User A may not only receive points for direct re-shares of his or her original share, but also receive points for all subsequent re-shares. For example, if user B re-shares user A's sharing of the video clip, and user C re-shares user B's re-sharing of user A's video clip, user A receives points for B's share, and C's share. Sharing may not be just limited to shares within the social network. Users may still receive points for shares across different social networks.

Points may be normalized by the number of shares to avoid the users from sharing items indiscriminately. For example, if user A earns 50 points for sharing item X and earns 150 points for sharing item Y, the points earned may be averaged and the user A may receive 100 points. Other normalizing methods may also be used.

Points or a score assigned to a particular user for sharing a particular item may be a function of its popularity, both on the social network and globally. For example, points may be earned based on how many times a video clip is shared. Points may be based on the number of re-shares of the video clip that is triggered by the particular user's sharing. Points may also be based on the number of shares or re-shares of the video clip that have been shared by any user, as long as the shares or re-shares are made after the particular user has shared the video clip. For example, when user A shares the video clip, user A may receive points for shares or re-shares of the same video clip that user B has independently shared, as long as the shares or re-shares occur after user A has shared the video clip. A separate type of score may be earned based on how many views the video garners. Due to the nature of assigning points based on the number of shares and/or views, the user's score will increase over time. Therefore, in order to receive more points, users are encouraged to share items early on.

In one aspect of the subject technology, the game may be limited to a small group of users over a short time interval. For example, a user may propose a contest to his or her social circle for a day to find a shared item which gains the most views. The game may also be played over an indefinite period of time open for all users of the social network. Other varying scopes of duration and participants may also be possible.

The system may also provide a user interface ("UI") which allows the users to track the current high-scoring users. The system may also award "badges" when the users reach certain milestones. For example, a user may receive a badge after sharing a popular singer's first music video when it had less than one million views. The users may also be assigned influence scores based on item views triggered by the user's sharing of the item. The influence score may be calculated in addition to the points discussed above, and may be made explicit on the social network. For example, the influence score of a user may be made prominent next to an item shared by the user. The system may also allow the user to view and keep track of the number of shares his or her item has gained.

For example, the shared item may be tagged with the number of shares and shown in the user's stream or news feed as the item gains more shares or views. This may provide an affirmation to a casual user that his or her shared item is gaining recognition, encouraging a more active participation.

In an aspect of the subject technology, the points received for sharing an item may be associated with a monetary reward. For example, the user may be financially compensated based on the received points. Also, a data structure may be provided to store the points for the users of the social network.

The phrase "social network" as used herein encompasses its plain and ordinary meaning, including, but not limited to, an online service, platform or site that focuses on building and reflecting of social associations and interactions among users. Users of the social network may create social associations with one another (e.g., identify other users as friends). Such user associations may be defined on a user-to-user basis, or as a group of users associated through membership within a group. The user associations may be symmetrical or asymmetrical.

The phrase "sharing" as used herein encompasses its plain and ordinary meaning, including, but not limited to, making a social item accessible to users within or outside a social network. A user may share a social item by, for example, uploading a social item onto the social network such that one or more users of the social network may be able to access the social item. A social item may also be shared when a user provides an indication of interest to a social item that another user has shared.

Turning to the drawings, FIG. 1 illustrates an example architecture 100 for assessing sharing of items within a social network. The architecture 100 may include a social network 110. The social network 110 may include a system 120 for assessing sharing of items within a social network. The system 120 may be an integral part of the social network 110, or may be an independent system in communication with the social network 110 through the network 130. User terminals 140 may be in communication with the social network 110 and the system 120 through the network 130. The user terminals 140 may be, for example, desktop computers, laptop computers, mobile devices (e.g., a smartphone, tablet computer, or PDA), set top boxes (e.g., for a television), video game consoles, or any other devices having appropriate processor, memory, and communications capabilities.

The network 130 may be, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
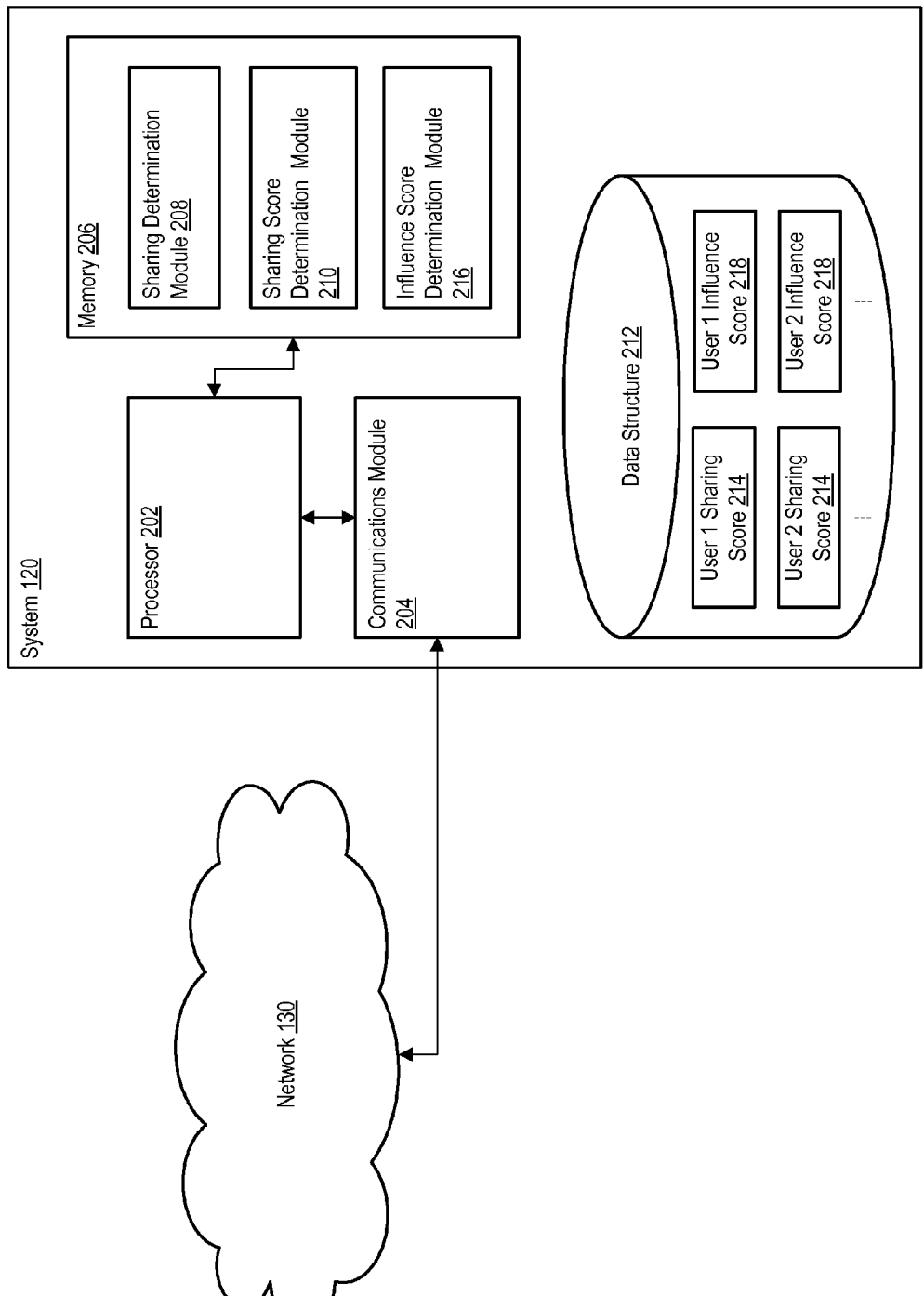
FIG. 2 is a block diagram illustrating an example system for assessing sharing of items within a social network.

FIG. 2 is a block diagram 200 illustrating an example system 120 for assessing sharing of items within a social network according to certain aspects of the disclosure. The system 120 may include a processor 202, a communications module 204, and a memory 206. The communications module 204 may be coupled to the processor 202, and communication between the system 120 and the social network 110 or the user terminals 140 may be done using the communications module 204.

The processor 202 may be configured to execute instructions, such as instructions physically coded into the processor 202, instructions received from software in memory 206, or a combination of both. For example, the processor 202 may execute instructions to identify a first sharing of a social item by a first user of a plurality of users within the social network 110. The social item may be, for example, web site links, video clips, and articles that other users may find interesting. The first user may be, for example, a user of the social network 110. Users of the social network 110, including the first user, may share a social item by uploading, posting, or providing a link to the social item, or otherwise making the social item available to at least one other user on the social network.

The software in the memory 206 may include components such as a sharing determination module 208 and the sharing score determination module 210. The sharing determination module 208 may include instructions for identifying a first sharing. This first sharing may be a sharing of a social item which is shared on the social network 110 for the first time by a given user. The sharing determination module 208 may also include instructions for determining one or more second sharings of the social item originally shared by the first sharing. Users other than the first user may view the social item and re-share the social item, thus performing a second sharing. After the first sharing, the social item may only be easily accessible by users that have a close relationship with the first user, such as, for example, the "friends" of the first user or those who are in the same "social circle" as the first user. The second user may be one of such friends or a social circle member of the first user, but may also have other friends who are not friends with the first user. Therefore, the second sharing may allow the item to be available to other users of the social network 110 who may not have had access to the social item after the first sharing. Multiple users may perform a second sharing of the social item shared by the first sharing.

The sharing determination module 208 may also contain instructions for determining whether any subsequent re-shares have been made based on each of the second sharings. The subsequent re-sharings may include any sharings of the social item which may trace their roots back to the first sharing by the first user. All sharings of the social item in the subsequent chains of re-shares may be determined. The sharing determination module 208 may also contain instructions for determining the popularity that the social item has gained after the first sharing. For example, the instructions determine all shares or re-shares of the social item by any user made after the first sharing, regardless of whether such shares may be traced back to the first sharing.

The sharing score determination module 210 may include instructions for determining a sharing score for the first user. The sharing score may be determined for each social item for which the first user has made a first sharing. The sharing score may be determined based on the number of second or subsequent re-sharings that the first sharing of a given social item has triggered. In an aspect, the sharing score may be determined to be directly proportional to the total number of second and subsequent re-shares that are triggered by the first sharing. In another aspect, different weights may be given as the sharings are further removed from the first sharing in the chain of re-shares. For example, the sharings may be weighted such that the number of second sharings is given full credit, the number of third sharings is given 90%, the number of fourth sharings is given 80%, and so forth. The first sharing may also be considered in determining the sharing score 214. For example, the first user may receive a predetermined point to be added to the sharing score 214 just by performing a first sharing. Also, in an aspect of the subject technology, the sharing score 214 may be determined based on all shares or re-shares of the social item that has been made after the first sharing, regardless of whether such shares are triggered by the first sharing. Such sharing score (determined regardless of whether shares are triggered by the first sharing) may be separately determined and stored, for example, in the data structure 212, and may be called a trendspotter score.

In order to discourage the users from indiscriminately sharing social items, the sharing score to be associated with the first user may be normalized over the number of social items shared by the first user. For example, if the first user makes first sharings of three social items A, B, and C, and if each item produces 100, 200, and 300 points, respectively, the score applied to the first user may be an average of the three scores, which is 200. This way, the first user is encouraged to share only high quality social items which have more chances of triggering more subsequent re-sharings. Other schemes for normalizing the sharing scores may also be used.

The software in the memory 206 may also include components such as an influence score determination module 216. The influence score determination module 216 may contain instructions for determining an influence score 218 of the users of the social network 110. The influence score 218 may be assigned to the users to reflect how much popularity or influence the social items that a given user shared through the first sharings have gained. The influence score 218 may be determined based on the number of views that the first user has triggered by performing the first sharing. The influence score 218 may also be determined based on the number of views of the social item that has been made after the first sharing, regardless of whether the views were triggered by the first sharing. An influence score 218 may be determined for each social item shared by the first user, or a single influence score may be assigned to each user which encompasses the number of views of all the social items shared by a given user. The influence score 218 may be determined based on all of the given user's prior and present first sharings, or those satisfying a predetermined criteria such as, for example, the most recent first sharings, or first sharings passing a certain threshold. As with the sharing scores 214 discussed above, the influence scores 218 may also be normalized over the number of first sharings for the given user.

The sharing score 214 may be combined with the influence score 218 such that the sharing score is determined based on both the number of views and the number of re-shares. The combined sharing score may be based on the number of re-shares and views triggered by the first sharing, or may be based on the number of any shares or re-shares and any views made after the first sharing, regardless of whether they were triggered by the first sharing. In one aspect of the subject technology, the two types of the combined sharing scores are separately determined and stored, for example, in the data structure 212.

The modules 208, 210, and 216 may be implemented as a single module or incorporated into other instructions stored in the memory 206. The modules 208, 210, 216 may also be implemented as independent hardware modules in communication with the processor 202. System 120 may also include a data structure 212 which may store the sharing scores 214 and the influence scores 218. The data structure 212 may be stored inside the memory 206, or may be stored in an external storage means outside of the memory 206 such as, for example, a separate database or a cloud-based storage in communication with the processor 202.

The sharing scores 214 or the influence scores 218 may be determined not only based on activities within the same social network 110, but also based on activities across different social networks. For example, if a social item shared by a first sharing on social network A triggers a second sharing on social network B, the second sharing on the social network B and its subsequent sharings may also be considered in determining the sharing scores 214 for the first user in the social network A. Any views of the social item made on the social network B may also be considered in determining the influence score 218 for the first user in the social network A.

The processor 202 may also execute instructions (e.g. instructions stored in the sharing determination module 208) to determine one or more second sharings of the social item by one or more second users, based on the first sharing. The processor 202 may further execute instructions (e.g. instructions stored in the sharing score determination module 210) to determine a sharing score 214 associated with the first user based on the number of the one or more second sharings. The data structure 212 may be updated with such determined sharing score 214 associated with the first user.

Figure 3:
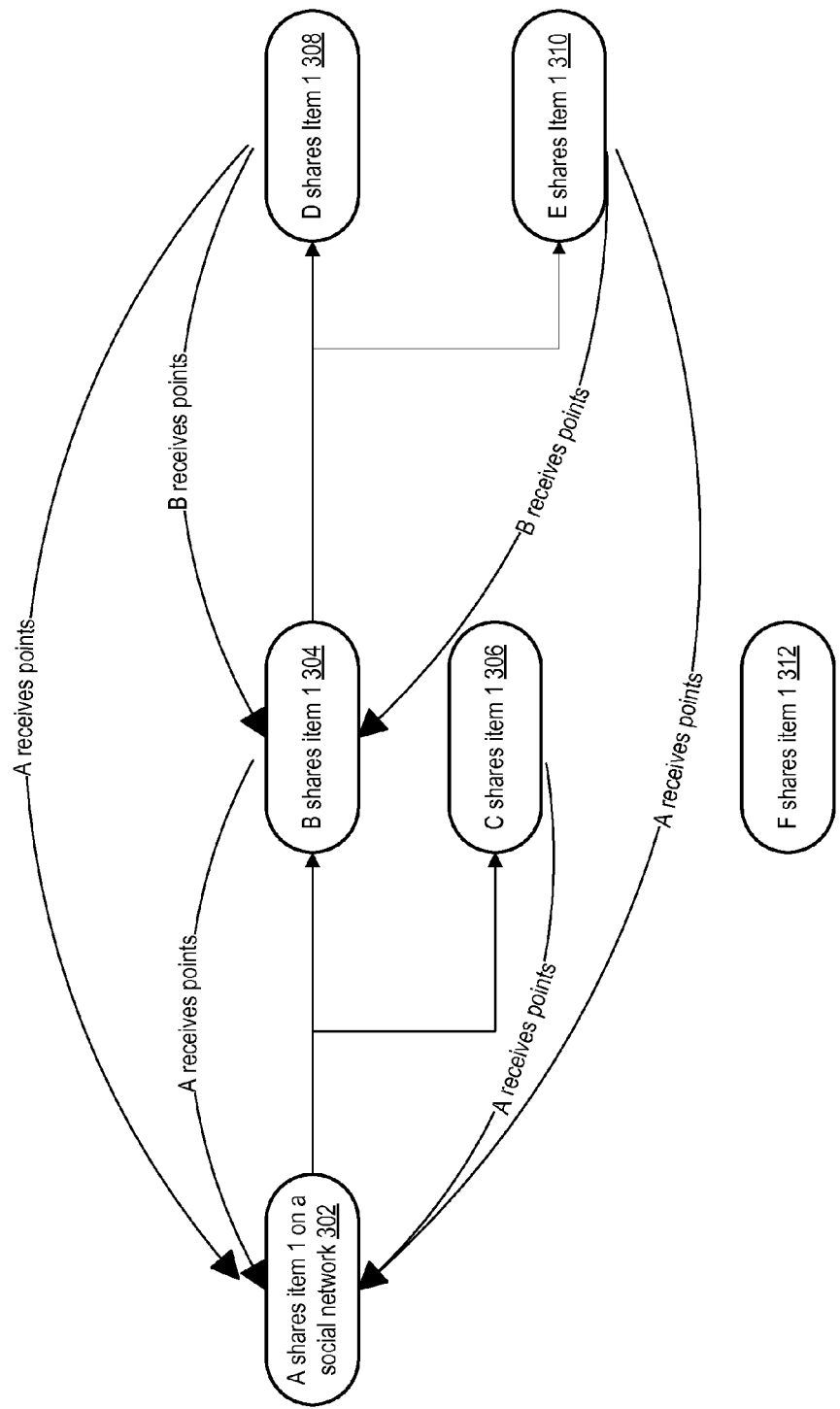
FIG. 3 is a schematic diagram illustrating an example of a first sharing and subsequent sharings of a social item.

FIG. 3 is a schematic diagram 300 illustrating an example of a first sharing and subsequent re-sharings of a social item using a system (e.g., system 120) for assessing sharing of items within a social network. In step 302, user A uploads item 1, a social item, on a social network (e.g., social network 110), thereby performing a first sharing of item 1. Item 1 shared by user 1 may be made available to other users of the social network in a variety of ways. Item 1 may be posted on a section of a social network such that it is made available for all users of the social network for viewing. Such section may be, for example, a stream or other pages on the social network where social items shared by a user of the social network is made accessible to other users. User A may set limitations on which users, or what type of users, of the social network may have access to the shared item 1. For example, user A may allow only his or her friends or members of a particular social circle on the social network to have access to item 1. The users may also receive notifications (e.g. an email or a message on the user's "stream") that user A has shared item 1 on the social network, and be provided with a link through which the users may access item 1.

User A may receive points to be added to his or her influence score (e.g., influence score 218) as other users view item 1 as a result of his or her sharing of the item. The influence score may be displayed on the social network such that other users may be able to view the influence, provided that the user has authorized the social network to make this information available to other users. User A may also limit which user, or what type of user may have access to his or her influence score. The influence score may be displayed in places such as, for example, next to item 1, or in user A's profile page. The influence score may reflect only the number of views item 1 has triggered, or may reflect the total number of views which all the items that user A has shared on the social network has triggered.

In step 304, user B views item 1 shared by user A and re-shares item 1, thereby performing a second sharing. User A receives a predetermined amount of points to be added to the sharing score (e.g., sharing score 214) based on this second sharing of item 1 by user B. User A may also receive additional points to be added to his or her influence score for the number of views of item 1 that the second sharing triggers.

User A may be provided with a user interface ("UI") for viewing his or her sharing score received for item 1. For example, a separate page may be provided which the user may access to view the sharing scores for item 1, and other social items which user A has shared on the social network. The page may also include user A's influence score. In step 306, in addition to user B, user C also performs a second sharing of item 1, based on user A's first sharing. User A again receives points to be added to his or her sharing score for the second sharing of item 1 by user C. Any views of item 1 that are triggered by user C's second sharing may also provide points to be added to user A's influence score.

User D accesses the social network and views item 1 that has been re-shared by user B. User D finds item 1 interesting, and in step 308, re-shares item 1 based on user B's second sharing, thereby performing a third sharing of item 1. Here, user A receives sharing score points for user D's third sharing of item 1. User A receives points for user D's third sharing since user D's third sharing may trace back ultimately to user A's first sharing. User A may also receive additional points for his or her influence score for any views on item 1 triggered by user D's third sharing.

In an aspect of the subject technology, user B may also receive points in addition to user A, since the third sharing by user D in step 308 is based on user B's second sharing. However, user C does not receive any points for user D's third sharing of item 1, since user D did not base its third sharing on user C's second sharing. In addition to user D, in step 310, user E also performs a third sharing of item 1 based on user B's second sharing. Again, user A receives sharing score points for his or her sharing score 214 for user E's third sharing, and points for his or her influence score 218 for item views triggered by user E's third sharing. In the aspect above where user B received points for user D's sharing, user B also receives points to be added to his or her sharing score for user E's sharing, since user E's sharing is based on user B's second sharing. As with in step 308, user C does not receive any points.

In step 312, user F independently uploads item 1, the same social item that user A shared, on the social network. However, in this case, none of users A-E receive any points, since the sharing by user F was not based on a sharing of the item by any of users the A-E.

In an aspect of the subject technology, the sharing scores and the influence scores may be used as a basis for a game which the users of the social network may play. For example, the goal of the game would be to earn the highest sharing score, influence score or both, among the users. In this game, a user who shares more interesting social items earlier than other users has a higher likelihood of receiving a higher score. This game may be played indefinitely, such that the highest scoring user may keep changing as long as the social network is in operation. The game may also be played only for a predetermined period of time and/or for a limited number of users, so that a winner (highest-scoring user) is determined for each game. A separate UI may be provided such that the high-scoring users may be displayed to the users of the social network. For example, a top-ten list displaying ten users currently having the highest sharing scores may be displayed at a section of the social network. Other UIs displaying other statistics may also be provided.

Each user participating in the game may also be notified of his or her progress. For example, as the user reaches certain milestones, the user may receive a "badge"—an identifier which indicates to the users that a user has reached certain achievements. The milestones may be, for example, reaching a predetermined sharing score/influence score, or sharing a predetermined number of social items. Upon authorization by the user, the badges may be displayed in the user's profile or other places where other users may see. Notification of the user's progress may also be made in other ways. For example, the user's current sharing score and/or influence score may be displayed on the user's stream or news feed at predetermined time periods. As another example, the user's current progress may be sent to the user via email.

In an aspect of the subject technology, the sharing scores or the influence scores may be associated with a monetary value. For example, after earning a predetermined sharing score or influence score, the user may exchange the scores with a monetary value for the user's consumption. The scores may also be redeemed for points for credit card accounts, mileage points to be used in air travel, or coupons for receiving discounts on goods or services. In another example, the users may be provided with currency, such as US dollars or European Euros, instead of sharing scores or influence scores.

Figure 4:
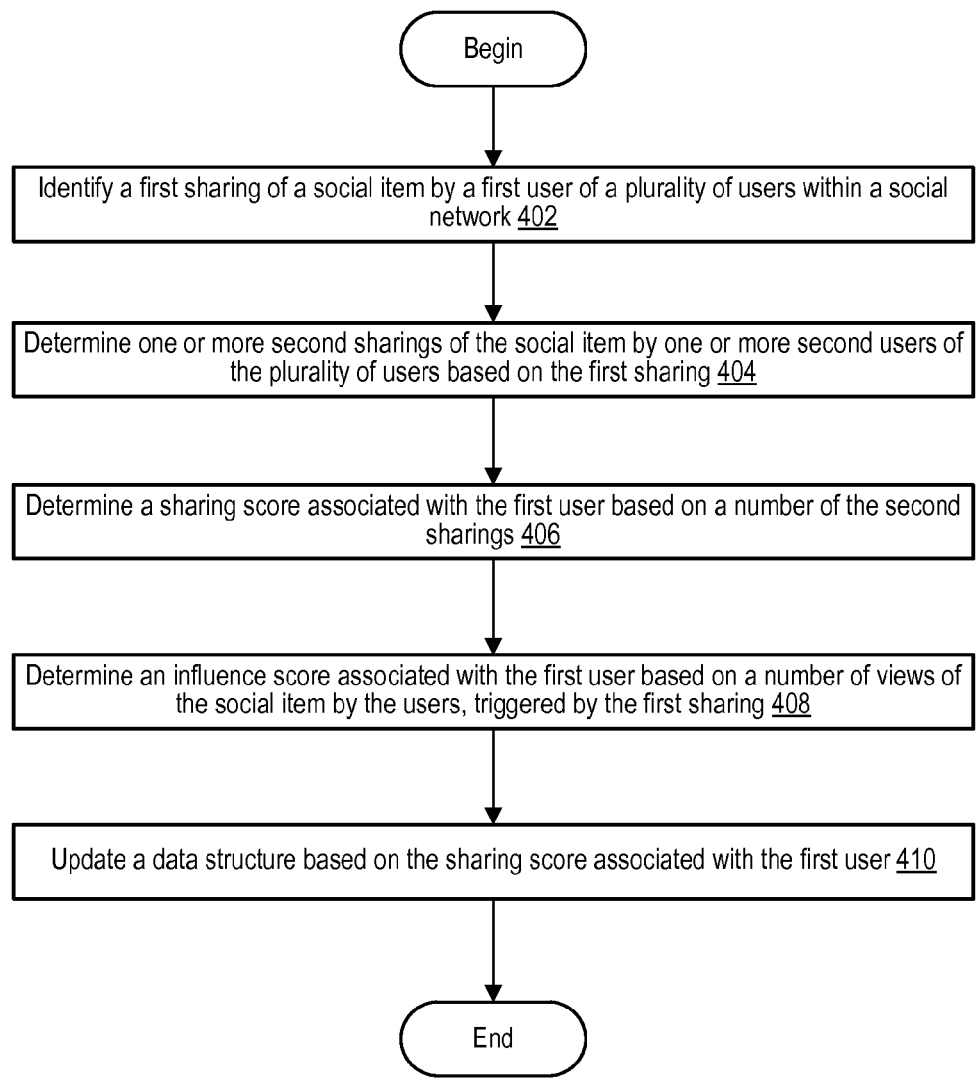
FIG. 4 illustrates a flow diagram of an example process for assessing sharing of items within a social network.

FIG. 4 illustrates an example flow diagram 400 of the process which may be performed by a system for assessing sharing of items within a social network (e.g., system 120). The process of FIG. 4 may be performed, for example, by the processor 202 based on instructions stored in the memory 206. In step 402, a first sharing of a social item by a first user of a social network (e.g., social network 110) is identified. In step 404, second sharings of the social item by second users of the social network are determined. In this step, the subsequent re-sharings of the social item, such as a third sharing based on the second sharing and further re-sharings based on the third sharing, may also be determined. In step 406, a sharing score (e.g., sharing score 214) associated with the first user is determined. The sharing score is determined based on the number of second sharings made based on the first sharing of step 402. The sharing score may also be based on the number of any re-sharings subsequent to the second sharing of step 404, as long as the re-sharings are ultimately based on the first sharing of step 402.

In step 408, an influence score (e.g., influence score 218) associated with the first user is determined. The influence score is determined based on the number of views by other users the social item triggers. The number of views includes the number of views of the social item made possible by the first sharing of step 402, second sharing of step 404, or any subsequent re-sharing based on the first or second sharing, as long as the view of the social item by other users is made possible ultimately by the first sharing of step 402. In step 410, a data structure (e.g., data structure 212) is updated based on the sharing score determined in step 406. The data structure may also be updated based on the influence score determined in step 408.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, solid state disks or other computer-readable media, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
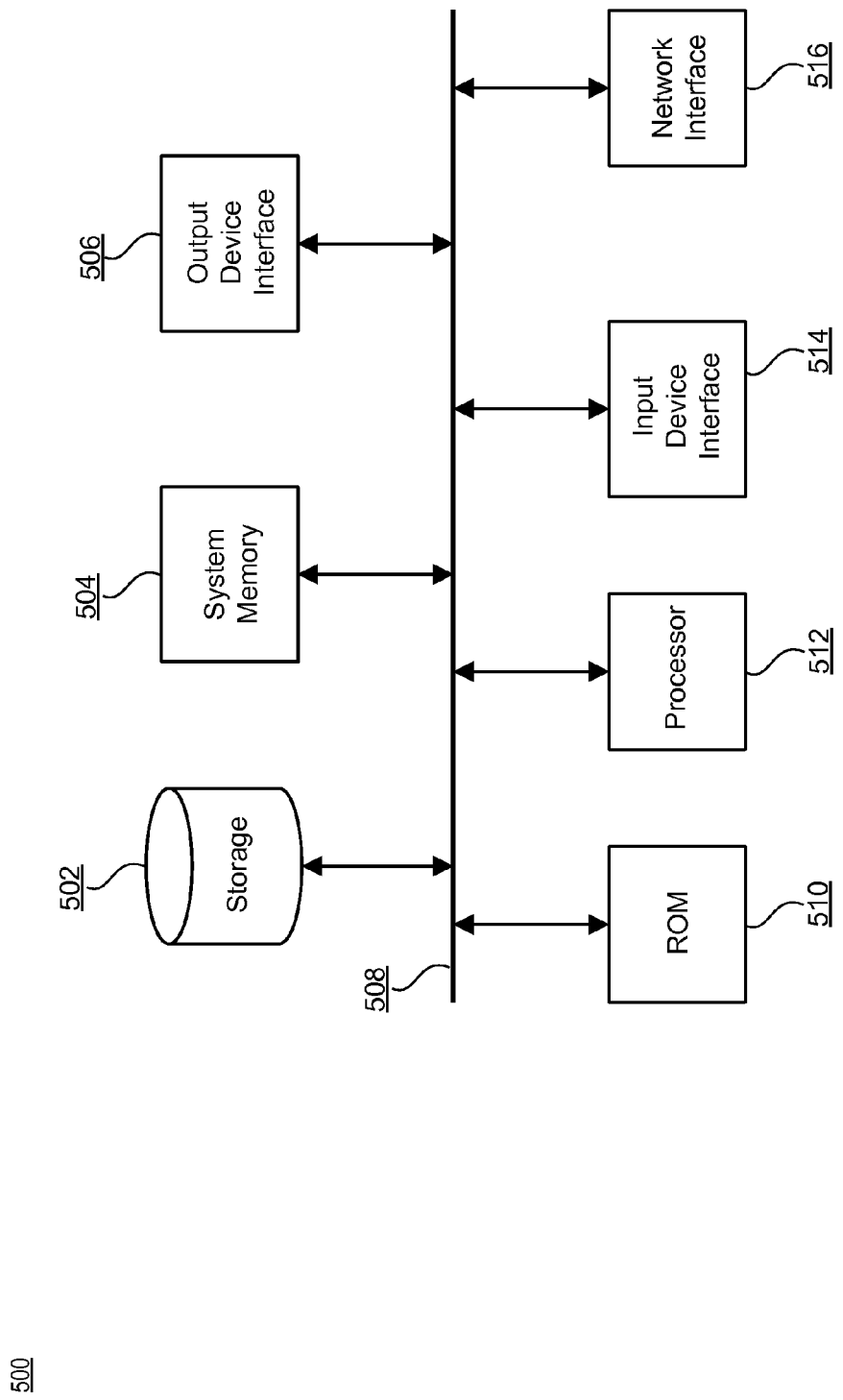
FIG. 5 is a conceptual diagram illustrating an example electronic system with which some implementations of the subject technology can be implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for assessing the sharing of items in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enable, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification of this application, the terms "computer", "server", "processor", and "memory" all refer to electronic or other technological devices. These terms exclude people or groups of people. For the purposes of the specification, the terms display or displaying means displaying on an electronic device. As used in this specification of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein is used to mean "serving as an example or illustration." Any aspect or design described herein as "exemplary" is not necessarily to be construed as preferred or advantageous over other aspects or designs.

The word "power user" as used herein encompasses its plain and ordinary meaning, including, but not limited to, a sophisticated user having considerable experience with computers and/or the social network. A power user of a social network may typically be an enthusiastic user that utilizes the most advanced features of the social network.

The word "badge" as used herein encompasses its plain and ordinary meaning, including, but not limited to, a symbol, mark, or an icon signifying that a user or an item associated with the badge has achieved a desired goal.

The word "friend" as used herein encompasses its plain and ordinary meaning, including, but not limited to, a user on a social network which another user has mutually made an association with. A friend of a user may have access to certain information of the user or items shared by the user that other users do not have access to.

The word "social circle" as used herein encompasses its plain and ordinary meaning, including, but not limited to, a group of users of a social network with which a user has made an association with. The association may be mutual or may not be mutual. Members of the social circles may have access to certain information of the user or items shared by the user that other users do not have access to.

All structural and functional equivalents to the elements of the various aspects described throughout this disclosure that are known or later come to be known to those of ordinary skill in the art are expressly incorporated herein by reference.

What is claimed is:

1. A computer-implemented method comprising:
identifying a first sharing of a social item by a first user of a social network;
determining one or more second sharings of the social item by one or more second users, the one or more second sharings being based on the first sharing;
determining one or more third sharings of the social item by one or more third users based on a second sharing of the one or more second sharings;
determining a sharing score associated with the first user based on a number of the one or more second sharings and a number of the one or more third sharings;

normalizing a plurality of sharing scores associated with the first user over a number of first sharings of social items by the first user, the plurality of sharing scores including the sharing score pertaining to the social item and one or more sharing scores pertaining to at least one other social item; and updating a data structure based on the normalized plurality of sharing scores associated with the first user, wherein the data structure stores respective sharing scores associated with a plurality of users of the social network.

2. The method of claim 1, wherein the identifying the first sharing of the social item comprises identifying that the social item is made accessible to one or more users of the social network other than the first user.

3. The method of claim 1, wherein the determining the one or more second sharings of the social item comprises determining that the social item is made accessible to one or more users within the social network or outside the social network.

4. The method of claim 1, wherein the determining the sharing score further comprises determining the sharing score based on the first sharing.

5. The method of claim 1, further comprising determining an influence score associated with the first user based on a number of views of the social item by the plurality of users.

6. The method of claim 5, further comprising:
identifying a prior sharing of a prior social item by the first user;
wherein the determining the influence score further comprises determining the influence score based on a number of views of the prior social item by the plurality of users.

7. The method of claim 1, wherein the determining the sharing score further comprises assigning different weights to the number of the one or more second sharings and the number of one or more third sharings.

8. The method of claim 1, wherein the determining the sharing score comprises determining the sharing score during a predetermined period of time.

9. The method of claim 1, further comprising generating a high score user interface comprising sharing scores associated with the plurality of users including the first user, that exceed a predetermined value.

10. The method of claim 1, further comprising notifying the first user of at least one of:
the sharing score associated with the first user; or
a number of views of the social item.

11. The method of claim 1, further comprising assigning a monetary value to the sharing score.

12. The method of claim 1, wherein normalizing the plurality of sharing scores comprises averaging the plurality of sharing scores.

13. A system comprising:
a memory storing a data structure storing respective sharing scores associated with a plurality of users of a social network and storing executable instructions; and
a processor coupled to the memory configured to execute the stored executable instructions to:
identify a first sharing of a social item by a first user of a plurality of users within a social network;
determine a second sharing of the social item by a second user of the plurality of users, the second sharing being based on the first sharing;
determine one or more third sharings of the social item by one or more third users of the plurality of users, the one or more third sharings being based on the second sharing;
determine a first sharing score associated with the first user based on a number of the second sharing and the one or more third sharings;
determine a second sharing score associated with the second user based on the number of the one or more third sharings;
normalize a plurality of first sharing scores associated with the first user over a number of first sharings of social items by the first user, the plurality of first sharing scores including the first sharing score pertaining to the social item and one or more sharing scores pertaining to at least one other social item; and
update the data structure based on the normalized plurality of sharing scores associated with the first user and the determined second sharing score associated with the second user.

14. The system of claim 13, wherein the determining the first sharing score further comprises determining the first sharing score based on the first sharing.

15. The system of claim 13, wherein the processor is further configured to determine an influence score associated with the first user based on a number of views of the social item by the plurality of users.

16. The system of claim 15, wherein the processor is further configured to:
identify a prior sharing of a prior social item by the first user;
wherein the determining the influence score further comprises determining the influence score based on a number of views of the prior social item by the plurality of users.

17. The system of claim 13, wherein the determining the first sharing score comprises determining the first sharing score during a predetermined period of time; and
wherein the determining the second sharing score comprises determining the second sharing score during the predetermined period of time.

18. The system of claim 13, wherein the processor is further configured to generate a high score user interface comprising sharing scores associated with the plurality of users including the first user, that exceed a predetermined value.

19. A non-transitory computer storage media comprising machine-readable instructions for causing a processor to execute a method comprising:
identifying a plurality of primary sharings, including a first primary sharing, of social items by a primary user of a plurality of users within a social network, wherein each primary sharing shares a different social item on the social network and the first primary sharing shares a first social item;
determining a plurality of secondary sharings by users other than the primary user of the plurality of users, each of the plurality of secondary sharings being based on the first primary sharing;
determining a plurality of tertiary sharings by users other than the primary user, each of the plurality of tertiary sharings being based one of the plurality of secondary sharings;
determining a sharing score associated with the primary user based on a number of the plurality of secondary sharings and a number of the plurality of tertiary sharings;
determining an influence score associated with the primary user based on a number of views of the first social item by the plurality of users;
normalizing a plurality of sharing scores associated with the primary user over a number of primary sharings of social items by the primary user, the plurality of sharing scores including the sharing score pertaining to the first social item and one or more sharing scores pertaining to at least one other social item;

updating a data structure based on the normalized plurality of sharing scores associated with the primary user and the determined influence score associated with the primary user, wherein the data structure stores respective sharing scores and influence scores associated with the plurality of users of the social network; and notifying the primary user of at least one of the sharing score or the influence score.

* * * * *